US011269363B2

(12) United States Patent
Ferrarini et al.

(10) Patent No.: US 11,269,363 B2
(45) Date of Patent: Mar. 8, 2022

(54) PRESSURE REGULATOR

(71) Applicant: CAMOZZI AUTOMATION S.P.A., Brescia (IT)

(72) Inventors: Dario Ferrarini, Brescia (IT); Andrea Camisani, Brescia (IT)

(73) Assignee: CAMOZZI AUTOMATION S.P.A., Brescia (IT)

( * ) Notice: Subject to any disclaimer, the term of this patent is extended or adjusted under 35 U.S.C. 154(b) by 0 days.

(21) Appl. No.: 17/042,647

(22) PCT Filed: Mar. 29, 2019

(86) PCT No.: PCT/IB2019/052589
§ 371 (c)(1),
(2) Date: Sep. 28, 2020

(87) PCT Pub. No.: WO2019/186483
PCT Pub. Date: Oct. 3, 2019

(65) Prior Publication Data
US 2021/0034082 A1    Feb. 4, 2021

(30) Foreign Application Priority Data
Mar. 30, 2018  (IT) ................ 102018000004110

(51) Int. Cl.
*G05D 16/20*  (2006.01)
*F16K 31/06*  (2006.01)
(Continued)

(52) U.S. Cl.
CPC ....... *G05D 16/2095* (2019.01); *F15B 21/087* (2013.01); *F16K 31/0675* (2013.01);
(Continued)

(58) Field of Classification Search
CPC ............ G05D 16/2053; G05D 16/2095; F16K 31/0675; F16K 31/128; F16K 31/42;
(Continued)

(56) References Cited

U.S. PATENT DOCUMENTS 6,305,401 B1    10/2001  Uehara et al.
6,356,811 B1*    3/2002  Beselt ................ G05D 16/2053
                                                                700/13
(Continued)

FOREIGN PATENT DOCUMENTS

EP    1867903 A2    12/2007
JP    3634459 B2     3/2005
(Continued)

OTHER PUBLICATIONS

International Search Report and Written Opinion for International Patent Application No. PCT/IB2019/052589, dated Jul. 22, 2019, 13 pages.
(Continued)

*Primary Examiner* — William M McCalister
(74) *Attorney, Agent, or Firm* — Armstrong Teasdale LLP

(57) ABSTRACT

A pressure regulator includes an outlet pressure sensor, loading and unloading electromagnetic valves, and a regulator control circuit operatively connected to the loading and unloading electromagnetic valves and configured to pilot the loading and unloading electromagnetic valves to cancel an error signal given by a difference between an inlet signal corresponding to a desired outlet pressure and a feedback signal provided by the outlet pressure sensor. The pressure regulator includes an engaging current analysis circuit to detect and store reference characteristics of the engaging current of the solenoid of the loading electromagnetic valve in a stable inlet pressure condition, monitor the engaging current to detect any variation of its characteristics with
(Continued)

respect to the corresponding reference characteristics, and, in the event of variation, provide a pilot modulation signal to at least one of the loading or unloading electromagnetic valves or a pressure variation signal to the regulator control circuit.

11 Claims, 4 Drawing Sheets

(51) Int. Cl.
*F15B 21/08* (2006.01)
*F15B 13/04* (2006.01)
*F16K 31/128* (2006.01)
*F16K 31/42* (2006.01)

(52) U.S. Cl.
CPC .. *G05D 16/2053* (2013.01); *F15B 2013/0409* (2013.01); *F15B 2211/50554* (2013.01); *F15B 2211/513* (2013.01); *F15B 2211/528* (2013.01); *F15B 2211/565* (2013.01); *F15B 2211/634* (2013.01); *F15B 2211/6306* (2013.01); *F15B 2211/665* (2013.01); *F15B 2211/6653* (2013.01); *F16K 31/128* (2013.01); *F16K 31/42* (2013.01); *Y10T 137/2544* (2015.04)

(58) Field of Classification Search
CPC .......... F15B 21/087; F15B 2211/50554; F15B 2211/513; F15B 2211/528; F15B 2211/565; F15B 2211/6306; F15B 2211/634; F15B 2211/665; F15B 2211/6653; F15B 2013/0409; Y10T 137/2544

USPC .............................. 137/102, 487.5, 488, 492
See application file for complete search history.

(56) References Cited

U.S. PATENT DOCUMENTS

| 2001/0054967 | A1* | 12/2001 | Vanderah | ................ G01F 1/363 340/626 |
| 2002/0117214 | A1* | 8/2002 | Tucker | ............... G05D 16/2053 137/487.5 |
| 2004/0025941 | A1* | 2/2004 | Wuerth | .................... B60T 8/36 137/487.5 |
| 2012/0319700 | A1 | 12/2012 | Keller et al. | |
| 2014/0358304 | A1* | 12/2014 | Muir | ................. G05D 16/2053 700/283 |
| 2015/0184683 | A1* | 7/2015 | Ogawa | ..................... F16F 9/49 91/55 |
| 2015/0300361 | A1* | 10/2015 | Fochtman | .............. G05B 15/02 700/282 |
| 2017/0350528 | A1* | 12/2017 | Fukunaga | ........... F16K 31/0675 |

FOREIGN PATENT DOCUMENTS

| JP | 2014146244 A | 8/2014 | |
| WO | 9835279 A1 | 8/1998 | |
| WO | WO-2015088432 A1 * | 6/2015 | ......... F16K 37/0041 |

OTHER PUBLICATIONS

International Preliminary Report on Patentability for International Patent Application No. PCT/IB2019/052589, dated Apr. 23, 2020, 12 pages.

* cited by examiner

PRESSURE REGULATOR

CROSS-REFERENCE TO RELATED APPLICATIONS

This application is a National Stage Application of International Patent Application No. PCT/IB2019/052589, having an International Filing Date of Mar. 29, 2019, which claims the benefit of priority to Italian Patent Application No. 102018000004110, filed Mar. 30, 2018, the entire contents of which are hereby incorporated by reference herein.

FIELD OF THE INVENTION

The present invention relates to a pressure regulator suitable for supplying a regulated pressure fluid to a device operating with a pressurized fluid.

BACKGROUND OF THE INVENTION

According to the preamble of claim 1, a known pressure regulator comprises an inlet passage connectable to a supply source of a pressurized fluid and an outlet passage, connectable for example to a device operating with a pressurized fluid. A supply valve is placed in a valve seat between the inlet passage and the outlet passage and is provided with adjustment means, for example membrane, suitable to regulate the outlet pressure of the fluid in the outlet passage so that it is proportional to the inlet pressure.

The regulator may be provided with an outlet pressure sensor suitable for detecting the outlet pressure, a loading electromagnetic valve having an inlet in fluid communication with the inlet passage and an outlet in fluid communication with the supply valve, and an unloading electromagnetic valve having an inlet in fluid communication with the supply valve and an unloading outlet.

The regulator is provided with a regulator control circuit configured to pilot the loading electromagnetic valve and the unloading electromagnetic valve so as to cancel an error signal given by the difference between an inlet signal corresponding to the desired outlet pressure and a feedback signal provided by the outlet pressure sensor.

At the start of the pressure regulator, an input signal representative of the desired outlet pressure value determines the activation of the loading electromagnetic valve and the disabling of the unloading electromagnetic valve, so that the inlet pressure acts on the regulation membrane of the supply valve, causing an opening of the valve seat and therefore a passage of the fluid under pressure from the inlet passage to the outlet passage.

The outlet pressure sensor monitors the outlet pressure and reports a feedback signal to the control circuit, which carries out a function in order to supply an outlet pressure proportional to the inlet signal.

The inlet pressure, in practice, may not be constant and its fluctuations influence the behavior of the loading and unloading electromagnetic valves, constituting an additional variable to be stabilized for the control circuit. It should be noted that the disturbing action determined by variations in the inlet pressure is detected only at the end of the feedback chain, i.e. at the regulator outlet, with possible delays and/or oscillations in the control.

To obviate such a drawback, it is also known to use an inlet pressure sensor, suitable for supplying the control circuit with information relating to variations in the inlet pressure.

It is evident that the presence of an inlet pressure sensor, in addition to the outlet pressure sensor, involves an increase in the complexity, dimensions and costs of the pressure regulator.

SUMMARY OF THE INVENTION

The object of the present invention is to propose a pressure regulator and a pressure regulation method capable of responding more effectively and rapidly to the disturbing action caused by variations in the inlet pressure, without however using an inlet pressure sensor.

Said object is achieved by a pressure regulator and a regulation method as described and claimed herein. Preferred embodiments of the invention are also described.

BRIEF DESCRIPTION OF THE DRAWINGS

The features and the advantages of the pressure regulator and of the regulation method according to the invention shall be made readily apparent from the following description of preferred embodiments thereof, provided purely by way of a non-limiting example, with reference to the accompanying figures, in which.

DETAILED DESCRIPTION

An electromagnetic valve, and in particular the loading electromagnetic valve of the regulator according to the invention described below, comprises an electromagnet formed by a solenoid, wound for example on a reel, and a magnetic circuit formed by a fixed armature, having for example a portion which partially penetrates the axial sleeve of the reel, and a movable core, which also partially penetrates the sleeve.

In a direct current electromagnetic valve, supplied with a constant supply voltage, for example 24V, 12V, or 5V, as soon as the solenoid is energized, the current in the solenoid increases, causing expansion of the magnetic field until it becomes high enough to move the movable core. The movement of the movable core increases the concentration of the magnetic field, since the magnetic mass of the core moves more and more inside the magnetic field.

Figure 1:
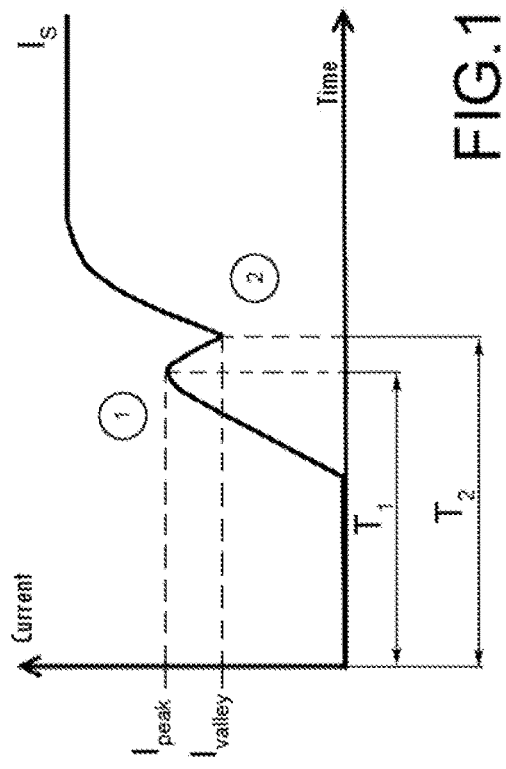
FIG. 1 is a graph representing, as a function of time, the waveform of the engaging current of the solenoid of an electromagnetic valve.

A magnetic field, which changes in the same direction as the current that generates it, induces a voltage of opposite sign in the turns of the solenoid. Since the magnetic field expands rapidly as the movable core moves to the end-of-travel position, this field causes a brief reduction in the current flowing in the solenoid winding. After the movable core has reached the end of its stroke, the current resumes to grow up to its maximum level. A typical waveform of the solenoid current IS is shown in FIG. 1.

As long as no supply voltage is applied to the solenoid, the solenoid current is zero.

When the solenoid is supplied, there is a first increase of the solenoid current IS, until a peak value $I_{PEAK}$ is reached, at the time T1, which, as said, corresponds to the engagement of the movable core, or at the beginning of its stroke towards the fixed armature. The solenoid current then undergoes a decrease until the attainment, at the instant T2, of a minimum value $I_{VALLEY}$, which corresponds to the abutment of the movable core against the fixed armature. At this point, the solenoid current begins to grow until it reaches its maximum value.

The idea underlying the present invention is based on the observation that, in an electromagnetic valve supplied with DC voltage, the waveform of the solenoid current, in the engagement step, depends on the inlet pressure.

Figure 1A:
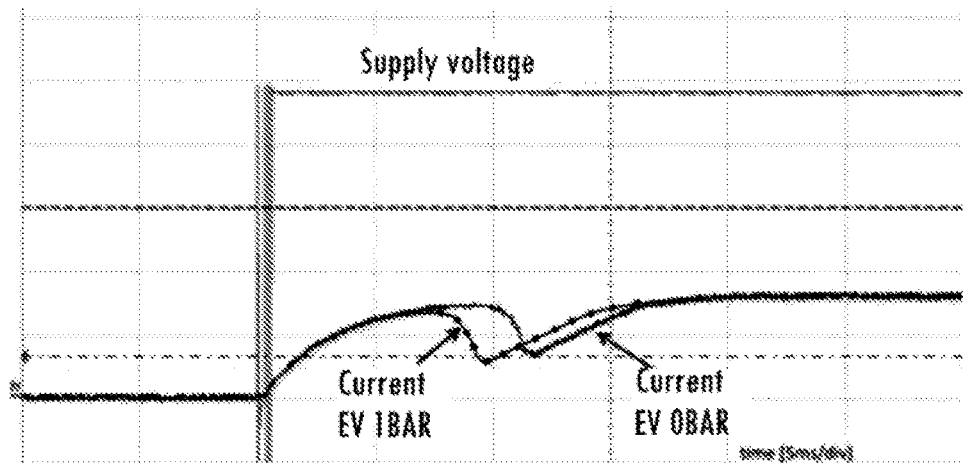
FIG. 1a is a graph representing the variation of the waveform of the engaging current in FIG. 1 as the inlet pressure varies.

In particular, as illustrated in the graph in FIG. 1a, as the inlet pressure increases there is a contraction in the engagement times of the electromagnetic valve, corresponding to an "advance" of the current waveform with respect to the waveform of the current at a lower inlet pressure.

Therefore, from the detection of any variations in the waveform of the engaging current, a corresponding change in the inlet pressure can be derived, obtaining the information at the same point in the control chain where it would be obtained from an inlet pressure sensor.

Figure 2:
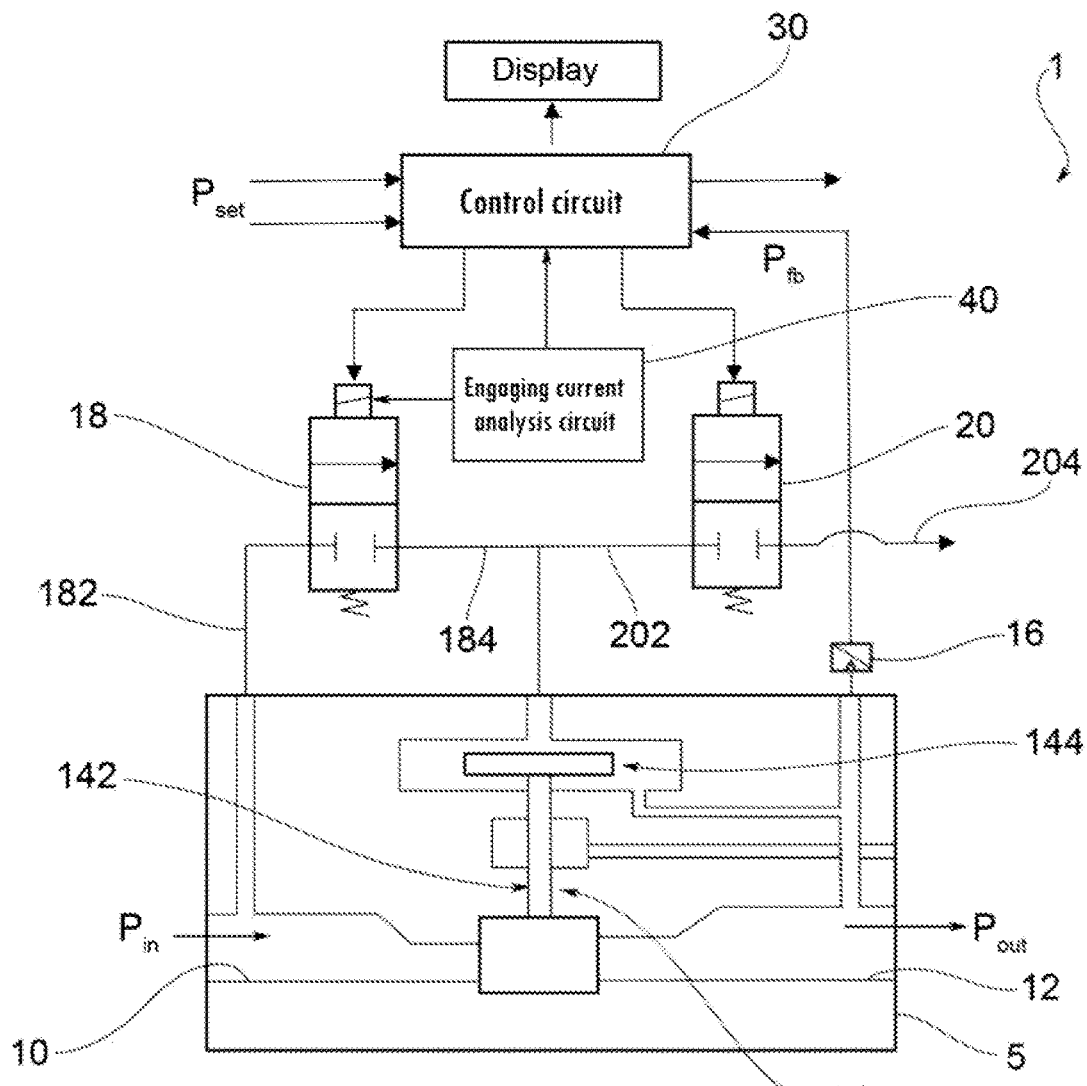
FIG. 2 schematically illustrates a pressure regulator according to the invention.

With reference to the diagram in FIG. 2, the pressure regulator 1 according to the invention comprises a regulator body 5 in which an inlet passage 10 is formed which is connectable to an inlet conduit of a fluid at an inlet pressure Pin, an outlet passage 12, and a valve seat 142 between the inlet passage 10 and the outlet passage 12.

A supply valve 14 is slidably positioned in the valve seat 142.

This supply valve 14 is provided with adjustment means 144 suitable to regulate the outlet pressure Pout of the fluid in the outlet passage 12 so that it is proportional to the inlet pressure Pin.

The pressure regulator 1 is provided with an outlet pressure sensor 16, suitable for detecting the outlet pressure Pout of the fluid in the outlet passage 12.

The pressure regulator 1 also comprises a loading electromagnetic valve 18 and an unloading electromagnetic valve 20.

The loading electromagnetic valve 18 has a loading electromagnetic valve inlet 182 in fluid communication with the inlet passage 10 and a loading electromagnetic valve outlet 184 in fluid communication with the supply valve 14.

The unloading electromagnetic valve 20 has an unloading electromagnetic valve inlet 202 in fluid communication with the supply valve 14 and an unloading electromagnetic valve outlet 204 in unloading.

The pressure regulator 1 further comprises a regulator control circuit 30 operatively connected to the loading electromagnetic valve 18 and to the unloading electromagnetic valve 20 and configured to pilot the loading electromagnetic valve 18 and the unloading electromagnetic valve 20 so as to cancel an error signal given by the difference between an inlet signal corresponding to the desired outlet pressure Pset, and a feedback signal Pfb provided by the outlet pressure sensor 16.

According to an aspect of the invention, the pressure regulator 1 comprises an engaging current analysis circuit 40 configured to:
a) detect and store reference characteristics of the waveform of the engaging current Is of the solenoid of the loading electromagnetic valve 18 in a stable inlet pressure condition;
b) monitor, during the operation of the regulator, the waveform of such an engaging current Is so as to detect any variations of its characteristics with respect to the corresponding reference characteristics;
c) in the event of variation, providing a pilot modulation signal to the loading electromagnetic valve 18 and/or unloading electromagnetic valve 20 and/or a pressure variation signal to the control circuit 30.

In an embodiment, the characteristics of the waveform of the engaging current Is comprise a first time interval, T1, which elapses between the excitation instant of the loading electromagnetic valve 18 and the first current peak, $I_{PEAK}$, generated by the engagement of the movable core of the loading electromagnetic valve 18.

In an embodiment, the characteristics of the waveform of the engaging current Is comprise a second time interval, T2, which elapses between the excitation instant of the loading electromagnetic valve 18 and/or of the unloading electromagnetic valve 20 and the minimum point $I_{VALLEY}$ of the value of the subsequent solenoid current at the first current peak $I_{PEAK}$, generated by the engagement of the movable core of the loading electromagnetic valve 18 and/or unloading electromagnetic valve 20.

In one embodiment, the features of the waveform that are stored and compared are the slope of the first waveform section between the instant of excitation of the solenoid valve and the first current peak and the slope of the second waveform section between the current peak $I_{PEAK}$ and the next minimum point $I_{VALLEY}$ of the value of the solenoid current.

For example, the slope of the first section is determined by calculating the ratio between the duration of the first time interval T1 of the waveform, i.e. the time interval between the solenoid excitation instant and the current peak, and the difference between the current value at the current peak and the initial current, which corresponds to zero.

The slope of the second section is estimated by calculating the ratio between the duration of the second time interval (T2–T1) of the waveform, i.e. the time interval between the instant T1 in which the current peak occurs and the instant T2 in which the current minimum value is obtained, and the difference between the value of the current corresponding to the minimum value and the value of the current at the current peak.

In one embodiment, the solenoid current values are obtained by sampling the waveform at predetermined time intervals by means of a current sampling circuit.

In an embodiment, the engaging current analysis circuit 40 compares each value of the sampled current received from the sampling circuit with the previous sampled current value and stores the sampled value in the memory register only if the result of the comparison reveals the achievement of the current peak or minimum current.

In a variant embodiment, the engaging current analysis circuit 40 is suitable for carrying out the comparison only with the engagement time T1 of the movable core, i.e. the first time interval that elapses between the instant of excitation of the solenoid and the instant of the current peak.

Figure 4:
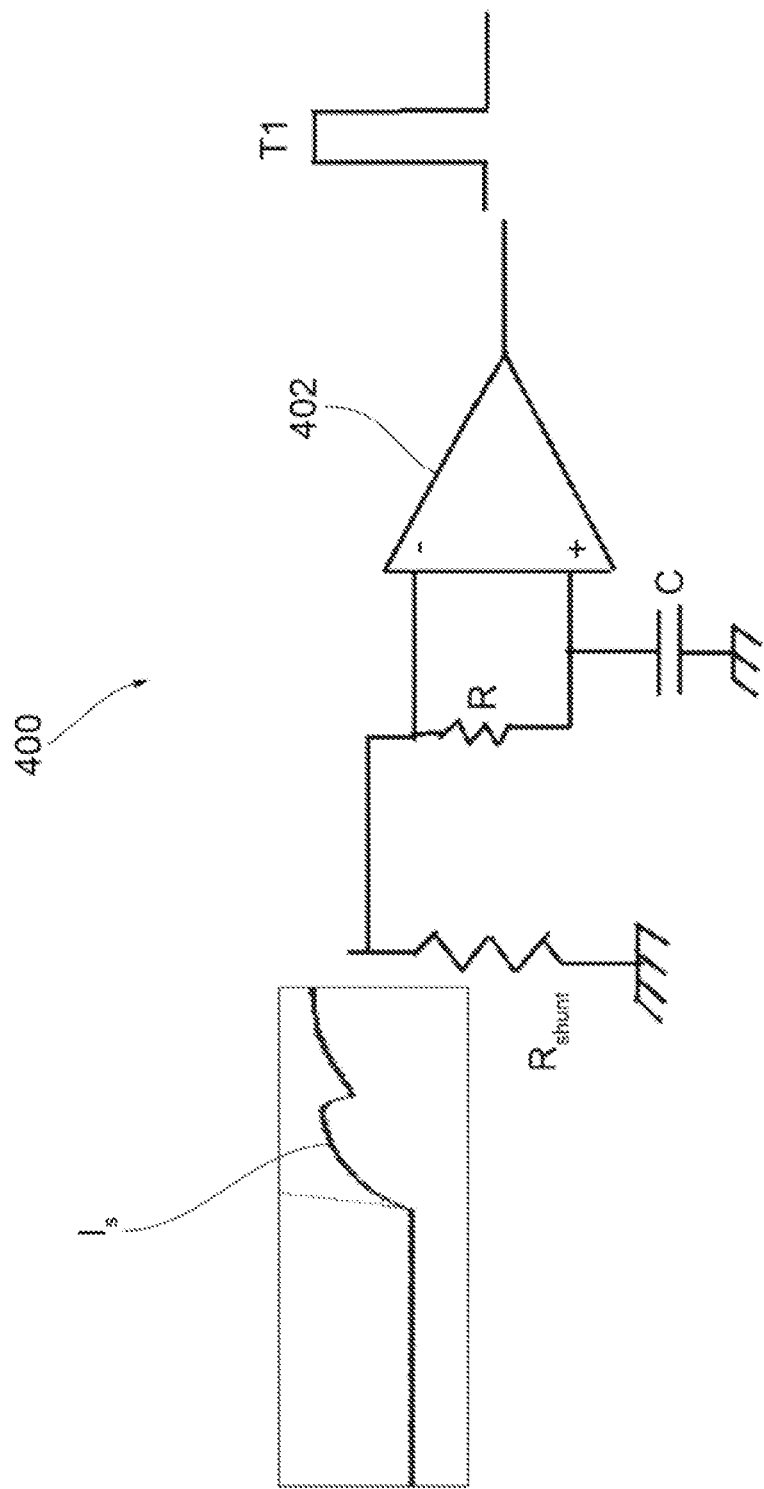
FIG. 4 is a circuit diagram of a circuit for measuring the current peak of the waveform of the solenoid current.

To detect this time interval, in one embodiment the engaging current analysis circuit 40 comprises an analog peak detection circuit 400, such as that shown in FIG. 4. In this circuit, the solenoid current sensed through a shunt resistance RSHUNT (inverting input) and the solenoid current to which a delay given by an RC network is applied (non-inverting input) are brought to the input terminals of an operational amplifier 402 with comparator function. In this way, the circuit is capable of detecting the instant T1 in which the solenoid current reaches the peak value $I_{PEAK}$.

Therefore, in one embodiment, the engaging current analysis circuit 40 detects and records at the start of the pressure regulator 1, or in any case in a situation of stable inlet pressure, one or both times T1 and T2 in which the current peak $I_{PEAK}$ and/or the minimum current $I_{VALLEY}$ occur; subsequently the control circuit 30 implements the function necessary to reach the desired outlet pressure value, given by the inlet signal PSET, using the feedback PFB provided by the outlet pressure sensor 16 to correct the error between the instantaneous outlet pressure value POUT and the setpoint PSET.

Figure 3:
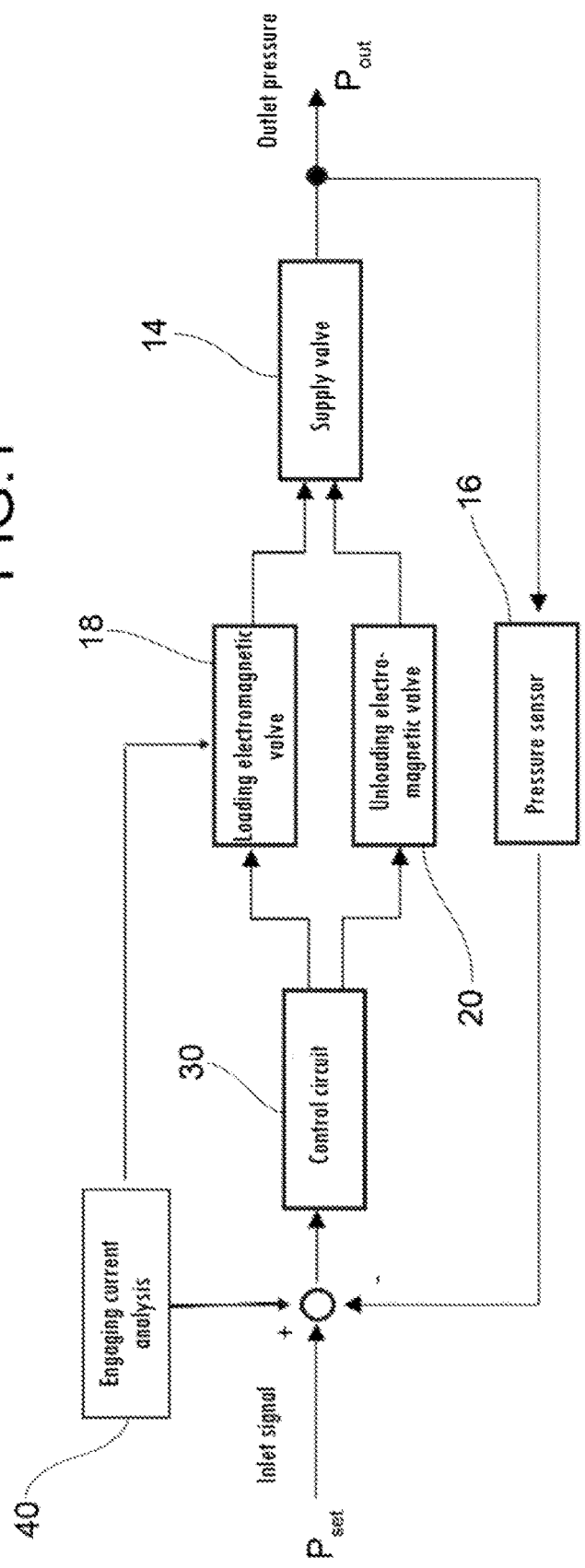
FIG. 3 is a block diagram of the control ring of the outlet pressure of the regulator of the present invention.

As shown in the block diagram in FIG. 3, the engaging current analysis circuit 40 can interact with the outlet pressure control ring by carrying out one or both of the following actions:
modulating the loading electromagnetic valve 18 and/or the unloading electromagnetic valve 20 according to the variation of the waveform of the engaging current thereof, to increase or stabilize its performance;
supplying to the control circuit 30 a third comparison magnitude, according to which the use of the loading electromagnetic valve 18 and/or unloading electromagnetic valve 20 are modulated.

The information on the variation of the inlet pressure, advantageously supplied to the control chain at a point corresponding to that in which there would be the information of a pressure sensor at the system inlet, allows the implementation of control algorithms dependent on the sign of the change in the inlet pressure.

For example, if the circuit for analyzing the engaging current detects a decrease in the timing of engagement T1 and/or T2, it means that the inlet pressure is increasing, the increase in pressure being proportional to the decrease in the engaging time. In this case, the control circuit 30 can perform a modulation of the loading electromagnetic valve 18 and/or of the unloading electromagnetic valve 20 which is less consistent than in the absence of this information on the inlet variation, only to have the information in any case from the outlet pressure sensor 16. In this way, the control is quick and free of oscillations.

Vice versa, if the inlet pressure is decreasing, it is possible to anticipate the increasing partialization of the loading electromagnetic valve 18, vice versa of the unloading electromagnetic valve 20.

In other words, as the inlet pressure decreases, the loading electromagnetic valve 18 and/or the unloading electromagnetic valve 20 will be energized for a longer time or with a higher duty cycle percentage to maintain the setpoint set based on a supposed higher inlet pressure.

It should be noted that the term "partialization of the electromagnetic valve" means that the electromagnetic valve can be operated for a longer time or with a higher duty cycle.

Therefore, according to an embodiment of the regulation method according to the invention, if the analysis circuit of the engaging current detects an increase in the inlet pressure with respect to a reference pressure value, the control circuit modulates the pilot signal of the loading electromagnetic valve and/or unloading electromagnetic valve in order to excite it for a shorter time or with a lower duty cycle percentage than the pilot signal at the reference pressure.

Vice versa, if the analysis circuit of the engaging current detects a decrease in the inlet pressure with respect to a reference pressure value, the control circuit modulates the pilot signal of the loading electromagnetic valve and/or unloading electromagnetic valve in order to excite it for a greater time or with a higher duty cycle percentage than the pilot signal at the reference pressure.

Figure 5:
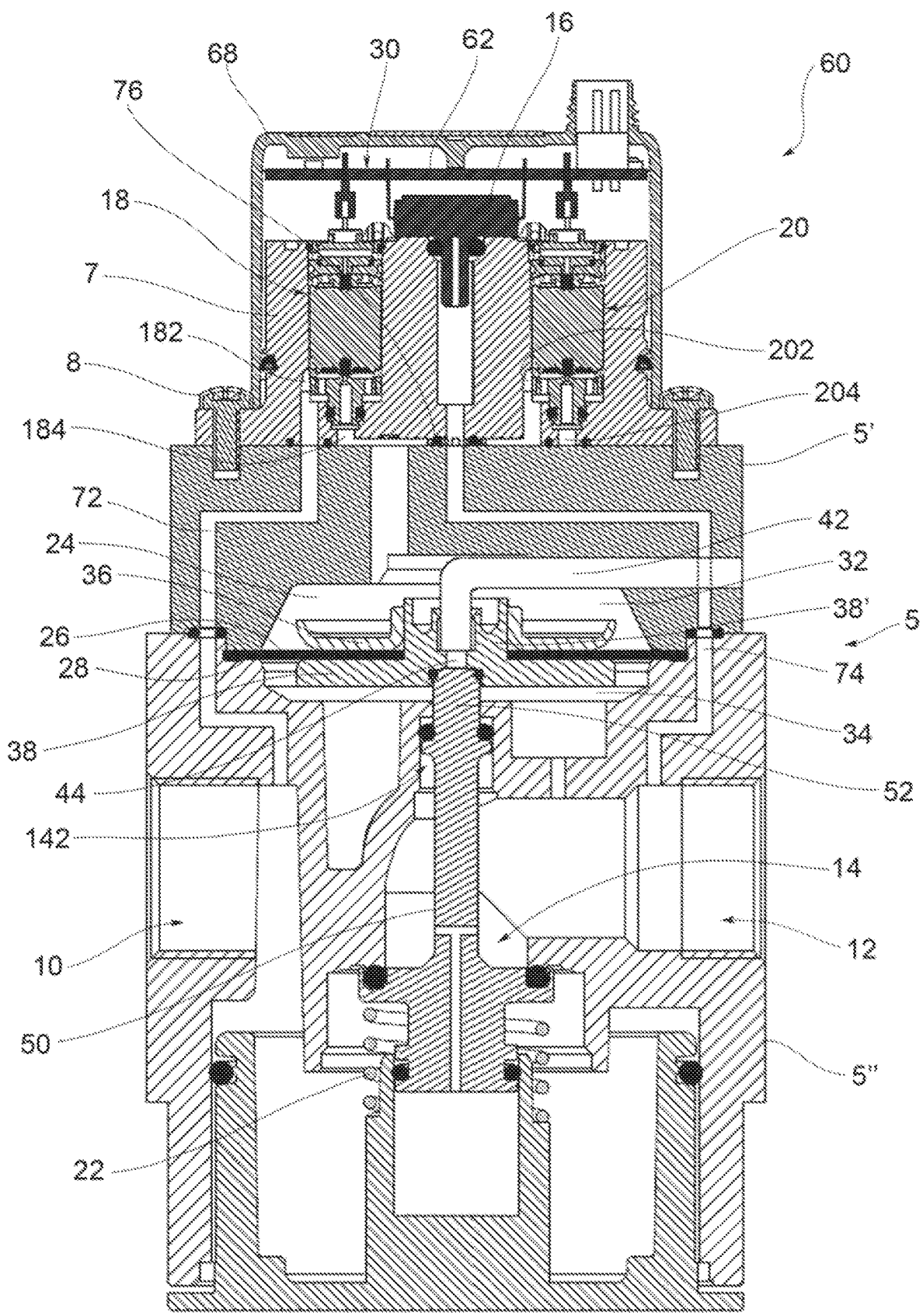
FIG. 5 is an axial section of a practical embodiment of a pressure regulator according to the invention.

With reference to FIG. 5, a practical example of pressure regulator 1 according to the present invention will now be described.

The regulator 1 comprises a first regulator body 5 in which the inlet passage 10 is formed, connectable to a supply source of a pressurized fluid, and the outlet passage 12, connectable to a device operating with a pressurized fluid, for example a cylinder.

In the first regulator body 5 a valve seat 142 is also formed between the inlet passage 10 and the outlet passage 12. This valve seat 142 houses the supply valve 14, which can be moved axially between an open position and a closed position of the valve seat 142 to allow or interrupt the flow of fluid from the inlet passage 10 to the outlet passage 12.

In one embodiment, the inlet passages 10 and outlet passages 12 are oriented in directions parallel to each other, for example coaxial, while the valve seat 142 has a seat axis orthogonal to such passages.

The supply valve 14 is influenced by an elastic means, for example a helical spring 22, to assume the closing position of the valve seat 142.

In the first regulator body 5 a membrane chamber 24 is formed in which a regulating membrane 26 is housed. The outer peripheral edge of the membrane 26 is retained in an annular recess 28 formed in an inner wall of the membrane chamber 24. For example, said annular recess 28 is obtained from the coupling between an upper portion 5' and a lower portion 5" of the regulator body 5 (considering the regulator 1 oriented vertically, i.e. with the inlet and outlet passages with horizontal axes). The membrane 26 and the upper portion of the membrane chamber 24 define an upper piloting chamber 32. The membrane 26 and the lower portion of the membrane chamber 24 define a lower unloading chamber 34.

In one embodiment, the membrane 26 is retained between a pair of disc elements 36, 38. More in detail, both the membrane 26 and the upper disc element 36 have a central opening in which a raised central portion 38' of the lower disc element 38 is inserted.

The upper piloting chamber 32 is suitable to receive a fluid at a piloting pressure. This fluid at the piloting pressure therefore acts on the upper side of the regulating membrane 26. The lower unloading chamber 34 is in fluid communication with the outlet conduit 12.

It should be noted that in the present description, for the sake of simplicity, a "membrane" is defined for the whole assembly housed in the membrane chamber 24, disc elements or other membrane support means included, which moves vertically downwards under the action of the pressurized fluid in the piloting chamber 32 and upwards in the presence of an overpressure in the unloading chamber 34.

In one embodiment, the lower unloading chamber 34 is in fluid communication with the external environment through an exhaust pipe 42. Through said exhaust pipe 42 it is therefore possible to discharge an excess pressure present in the outlet conduit 12.

According to an embodiment, the membrane 26 is operatively connected to the supply valve 14 in such a way that an increase in the piloting pressure on the membrane causes an opening of the valve seat 142.

Moreover, an unloading shutter 50 is operatively connected to the supply valve 14 and is suitable to prevent the passage of fluid through the exhaust pipe 42 when the membrane 26 is in an equilibrium condition or with the increase of the piloting pressure, and to allow the passage of fluid through said exhaust pipe 42 in the presence of excess pressure acting on the lower side of the membrane 26.

In one embodiment, the membrane 26 is traversed by an axial unloading passage 44 to the upper portion whereof leading into the piloting chamber 32 is connected the exhaust pipe 42. For example, said axial unloading passage 44 is formed in the protruding central portion 38' of the lower disc element 38.

In one embodiment, the exhaust pipe 42 passes through the piloting chamber 32 and flows into the atmosphere passing through an exhaust hole made in a wall of the first regulator body 5.

In an embodiment, in which the valve seat 142 is coaxial with the regulating membrane 26, the unloading shutter 50 is axially constrained to the supply valve 14 and has an upper end 52 suitable for sealingly engaging the lower portion of said axial passage 44.

More in detail, the unloading shutter 50 has an elongated shape, like a rod, which extends from the supply valve 14 to the membrane 26.

The pressure in the piloting chamber 32 is controlled by a pneumatic piloting regulator 60 comprising the loading electromagnetic valve 18, the unloading electromagnetic valve 20, and an electronic control board 62 which implements the control circuit 30. The engaging current analysis circuit 40 can be made on the same electronic control board 62 of the control circuit 30 or on an electronic electromagnetic valve board mounted on the loading electromagnetic valve 18.

In one embodiment, the pneumatic piloting regulator is mounted on the first regulator body 5. More in detail, the loading electromagnetic valve 18 and the unloading electromagnetic valve 20 are housed in a second body 7 fixed, for example by means of screws 8, to the upper portion 5' of the first regulator body 5.

For example, the second body 7, the electronic board 62 and the pressure sensor 16 are protected by a casing 68.

The pressure sensor 16, in fluid connection with the outlet conduit 12, is operatively connected to the electronic control board 62.

In one embodiment, in the first regulator body 5 a loading channel 72 is formed which fluidly connects the inlet passage 12 to the loading electromagnetic valve inlet 182 and a pressure detection channel 74 which fluidly connects the outlet passage 12 with the pressure sensor 16.

Therefore, a pneumatic interface 76 is formed between the top of the first regulator body 5 and the base of the second regulator body 7, which allows placing in fluid connection the loading electromagnetic valve 18 and the unloading electromagnetic valve 20 with the piloting chamber 32, the inlet passage 10 with the loading electromagnetic valve 18 and the outlet passage 12 with the pressure sensor 16.

A man skilled in the art may make several changes, adjustments, adaptations and replacements of elements with other functionally equivalent ones to the embodiments of the pressure regulator and of the regulation method according to the invention in order to meet incidental needs, without departing from the scope of the following claims. Each of the features described as belonging to a possible embodiment can be obtained independently of the other embodiments described.

What is claimed is:

1. A pressure regulator, comprising:
   an inlet passage connectable to an inlet conduit of a fluid at an inlet pressure;
   an outlet passage;
   a supply valve placed in a valve seat between the inlet passage and the outlet passage and provided with adjustment means to regulate an outlet pressure of the fluid in the outlet passage so that the outlet pressure is proportional to the inlet pressure;
   an outlet pressure sensor to detect the outlet pressure;
   a loading electromagnetic valve comprising an inlet in fluid communication with the inlet passage and an outlet in fluid communication with the supply valve;
   an unloading electromagnetic valve comprising an inlet in fluid communication with the supply valve and an outlet;
   a regulator control circuit operatively connected to the loading electromagnetic valve and to the unloading electromagnetic valve and configured to pilot the loading electromagnetic valve and the unloading electromagnetic valve to cancel an error signal given by a difference between an inlet signal corresponding to a desired outlet pressure and a feedback signal provided by the outlet pressure sensor,
   the pressure regulator further comprising an engaging current analysis circuit configured to:
   detect and store reference characteristics of a waveform of an engaging current of a solenoid of the loading electromagnetic valve in a stable inlet pressure condition;
   monitor, during operation of the pressure regulator, the waveform of the engaging current to detect any variations of its reference characteristics with respect to the corresponding reference characteristics; and
   in the event of variation, provide a pilot modulation signal to at least one of the loading electromagnetic valve or the unloading electromagnetic valve and/or a pressure variation signal to the regulator control circuit.

2. The pressure regulator of claim 1, wherein the reference characteristics of the waveform of the engaging current comprise a first time interval that elapses between an excitation instant of at least one of the loading electromagnetic valve or the unloading electromagnetic valve and a first current peak generated by engagement of a movable core of the loading electromagnetic valve and/or the unloading electromagnetic valve.

3. The pressure regulator of claim 2, wherein the reference characteristics of the waveform of the engaging current further comprise a second time interval that elapses between the excitation instant of at least one of the loading electromagnetic valve or the unloading electromagnetic valve and a minimum point of a subsequent solenoid current value at the first current peak generated by the engagement of the movable core of the loading electromagnetic valve and/or the unloading electromagnetic valve.

4. The pressure regulator of claim 1, wherein the engaging current analysis circuit comprises a current sampling circuit to sample a waveform of solenoid current at predetermined time intervals.

5. The pressure regulator of claim 1, wherein the engaging current analysis circuit further comprises an analog peak detection circuit comprising an operational amplifier with comparator function, the operational amplifier comprising an inverting input terminal that receives solenoid current sensed through a shunt resistor and a non-inverting input terminal that receives solenoid current to which is applied a delay given by an RC network.

6. The pressure regulator of claim 1, further comprising a first regulator body and a second regulator body mounted on the first regulator body, wherein the inlet passage, the outlet passage and the valve seat are formed in the first regulator body, and the loading and unloading electromagnetic valves and an electronic control board that forms the regulator control circuit are housed in the second regulator body, and wherein a loading channel fluidically connecting the inlet passage with the inlet of the loading electromagnetic valve, and a pressure detection channel fluidically connecting the outlet passage with the outlet pressure sensor are obtained in the first regulator body.

7. A method for regulating pressure of a fluid, the method comprising:

providing a pressure regulator comprising:
an inlet passage connectable to an inlet conduit of a fluid at an inlet pressure;
an outlet passage;
a supply valve placed in a valve seat between the inlet passage and the outlet passage and provided with adjustment means to regulate an outlet pressure of the fluid in the outlet passage so that the outlet pressure is proportional to the inlet pressure;
an outlet pressure sensor to detect the outlet pressure;
a loading electromechanical valve comprising an inlet in fluid communication with the inlet passage and an outlet in fluid communication with the supply valve;
an unloading electromagnetic valve comprising an inlet in fluid communication with the supply valve and an outlet;
a regulator control circuit operative connected to the loading electromagnetic valve and to the unloading electromagnetic valve and configured to pilot the loading electromagnetic valve and the unloading electromagnetic valve to cancel an error signal given by a difference between an inlet signal corresponding to a desired outlet pressure and a feedback signal provided by the outlet pressure sensor;
the pressure regulator further comprising an engaging current analysis circuit configured to:
detect and store reference characteristics of a waveform of an engaging current of a solenoid of the loading electromagnetic valve in a stable inlet pressure condition;
monitor, during operation of the pressure regulator, the waveform of said engaging current to detect any variation of its reference characteristics with respect to the corresponding reference characteristics; and
in the event of variation, provide a pilot modulation signal to at least one of the loading electromagnetic valve or the unloading electromagnetic valve and/or a pressure variation signal to the regulator control circuit;

detecting and storing the reference characteristics of the waveform of the engaging current of the solenoid of the loading electromagnetic valve in the stable inlet pressure condition;
monitoring during operation of the pressure regulator, the waveform of the engaging current to detect any variations of its characteristics with respect to the corresponding reference characteristics; and
in the event of variation, providing the pilot modulation signal to at least one of the loading electromagnetic valve or unloading electromagnetic valve and/or the pressure variation signal to the regulator control circuit.

8. The method of claim 7, wherein the reference characteristics of the waveform of the engaging current comprise a first time interval that elapses between an excitation instant of at least one of the loading electromagnetic valve or of the unloading electromagnetic valve and a first current peak generated by engagement of a movable core of the loading electromagnetic valve and/or the unloading electromagnetic valve.

9. The method of claim 8, wherein the reference characteristics of the waveform of the engaging current further comprise a second time interval that elapses between the excitation instant of at least one of the loading electromagnetic valve or of the unloading electromagnetic valve and a minimum point of a subsequent solenoid current value at the first current peak generated by the engagement of the movable core of the loading electromagnetic valve and/or unloading electromagnetic valve.

10. The method of claim 7, wherein, if the engaging current analysis circuit detects an increase in the inlet pressure with respect to a reference pressure value, the regulator control circuit modulates the pilot modulation signal of the loading electromagnetic valve to excite it for a shorter time or with a lower duty cycle percentage than the pilot modulation signal at the reference pressure.

11. The method of claim 7, wherein, if the engaging current analysis circuit detects a decrease in the inlet pressure with respect to a reference pressure value, the regulator control circuit modulates the pilot modulation signal of the loading electromagnetic valve and/or unloading electromagnetic valve to excite it for a greater time or with a higher duty cycle percentage than the pilot modulation signal at the reference pressure.

* * * * *